United States Patent [19]

Hagenlocher et al.

[11] 4,284,914
[45] Aug. 18, 1981

[54] PROTECTIVE COVER CAP FOR AN AUTOMOTIVE-TYPE ALTERNATOR-RECTIFIER COMBINATION

[75] Inventors: Walter Hagenlocher, Stuttgart; Heinz Hesse, Gerlingen; Karl Kleebaur, Allmersbach; Christoph Kugel, Stuttgart; Johann Künz, Sersheim; Werner Lemke, Bietigheim-Bissingen; Rüdiger Sohnle, Stuttgart, all of Fed. Rep. of Germany

[73] Assignee: Robert Bosch GmbH, Stuttgart, Fed. Rep. of Germany

[21] Appl. No.: 85,112

[22] Filed: Oct. 15, 1979

[30] Foreign Application Priority Data

Nov. 8, 1978 [DE] Fed. Rep. of Germany ....... 2848410

[51] Int. Cl.³ .......................................... H02K 11/00
[52] U.S. Cl. .................... 310/68 D; 310/89; 310/52
[58] Field of Search ............ 310/68 D, 68 R, 52, 310/60 R, 58, 85, 88–90

[56] References Cited

U.S. PATENT DOCUMENTS

| | | | |
|---|---|---|---|
| 2,950,402 | 8/1960 | Glaza | 310/88 X |
| 3,078,409 | 2/1963 | Bertsche et al. | 310/68 D X |
| 3,146,362 | 8/1964 | Bates | 310/68 R |
| 3,226,581 | 12/1965 | Brewster et al. | 310/68 R X |
| 3,527,972 | 9/1970 | Franz et al. | 310/68 D |
| 3,538,361 | 11/1970 | Hilterbrick et al. | 310/68 R |
| 3,553,505 | 1/1971 | Sato | 310/68 D |

FOREIGN PATENT DOCUMENTS 1352823  12/1965  France ..................... 363/145

*Primary Examiner*—Mark O. Budd
*Attorney, Agent, or Firm*—Frishauf, Holtz, Goodman & Woodward

[57] ABSTRACT

To direct cooling air to components which, in operation, require different amounts of cooling due to different heat dissipation, a cover cap is provided which prevents accidental contact with current-carrying elements and which is formed with slits or openings therein located with respect to the components requiring cooling to direct cooling air, upon induced axial airflow, to the respective components in relationship to their cooling requirements. Some of these openings may be formed with in-turned collars surrounding, for example, diode rectifiers, to direct air on and around the diode rectifiers, while preventing contact with their terminals.

10 Claims, 3 Drawing Figures

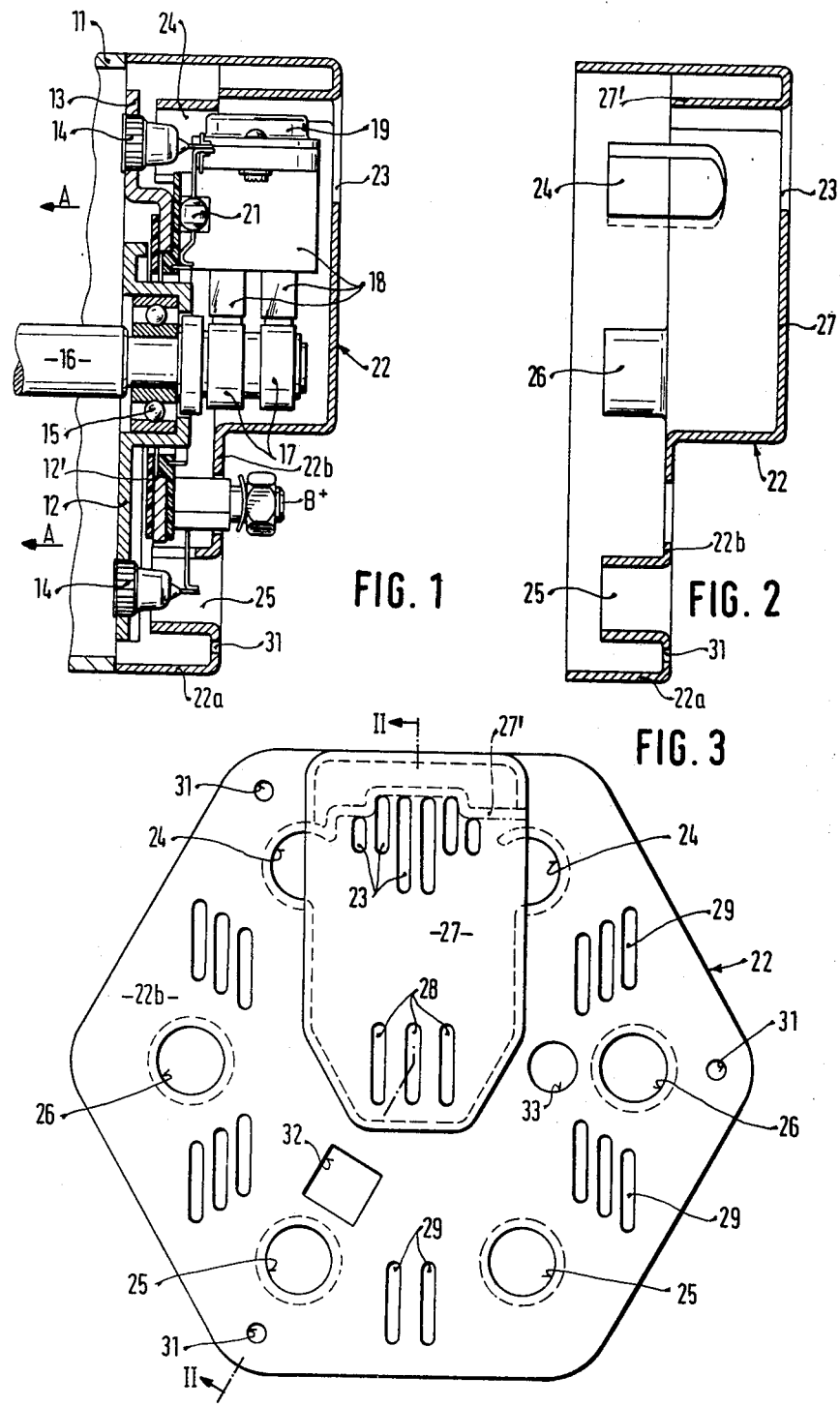

PROTECTIVE COVER CAP FOR AN AUTOMOTIVE-TYPE ALTERNATOR-RECTIFIER COMBINATION

Reference to related applications, all assigned to the assignee of the present application:

U.S. Ser. No. 085,116, filed Oct. 15, 1979, HAGENLOCHER et al.

U.S. Ser. No. 085,115, filed Oct. 15, 1979, HAGENLOCHER et al.

U.S. Ser. No. 085,113, filed Oct. 15, 1979, HAGENLOCHER et al.

U.S. Ser. No. 085,111, filed Oct. 15, 1979, HAGENLOCHER et al.

The present invention relates to alternator-rectifier combinations, and more particularly to a cover cap for an automotive-type alternator-rectifier combination, in which an end cover plate supports the rectifier connected to the alternator, to provide d-c output, particularly for the load and the battery of an automotive vehicle.

BACKGROUND AND PRIOR ART

Automotive-type alternators, particularly when combined with rectifiers, place high requirements of cooling on the rectifier elements. Additionally, the rectifiers should be protected against mechanical damage and, further, should be shielded against accidental contact by the user, or during maintenance of the alternator or the vehicle with which it is used. It has, therefore, been proposed to use cover caps with generators which are intended to separate the alternator and rectifier components which carry electrical current and which require cooling from other components of the machine, and to protect these elements against accidental contact. They must, however, be so constructed that they do not provide a complete air-tight enclosure since they must permit ingress of cooling air to the rectifier components and to the remainder of the generator. In many such known constructions, the end bell or end cover plate of the alternator itself, which is located close to the slip ring side—and remote from the drive side of the alternator—is formed with air ingress openings. The end cover plate, thus, takes over the function of an air directing and air inlet element. In some constructions, the cover plates or end bells simulaneously support the bearings and, thus, the cooling air ingress openings and the cover plate are in a single plane, namely the plane of the cover plate itself. The air ingress openings cannot always be formed in the cover plate at the most desirable positions to direct air to those parts which need cooling the most. It is difficult to obtain proper dimensioning of the opening for the cooling air and properly dimensioned and positioned openings in relation to the elements of the alternator and of the rectifier which require cooling.

THE INVENTION

It is an object to provide a cover cap construction which mechanically protects rectifier elements associated with an alternator and, simultaneously, permits placement of air supply openings to accept cooling air to be drawn to those components of the rectifier which require most cooling, and the elements of the alternator which require cooling. Air is drawn through the alternator, as is customary, by a ventilator or fan secured to the alternator shaft.

Briefly, the cover cap is a cup-like structure formed with openings therein located on the structure and directing air flow to cool the component elements of the alternator requiring cooling, that is, end plates or support plates for the rectifiers associated with the alternator, the rectifier diodes themselves, and permitting further airflow through the alternator. The cup-like structure can be made of sheet metal or plastic and has a rim portion and a bottom portion, the rim portion fitting against the alternator frame, and spacing the bottom portion by a distance which is longer than the projection of any one of the component elements to prevent accidental contact with any one of the component elements, even though some of the component elements may be located opposite air ingress openings to provide for maximum cooling thereof.

The arrangement permits placement of an end cap, of cup-like construction, with respect to the alternator such that the cooling flow of air is optimally directed to those components requiring cooling, so that the components requiring most cooling will be in the optimum stream of cooling air. The openings in the end cap can be so located and dimensioned that effective airflow is directed to those components requiring cooling air, independently of location and mechanical strength requirements of structural components of the alternator as such, or its rectifier assembly.

In accordance with a feature of the invention, the end cap is formed with in-turned collars which direct air specifically to components requiring maximum cooling, for example the rectifier diode elements themselves while, simultaneously, protecting the rectifier diodes against accidental contact from the outside, since the bottom portion of the cup-like element projects somewhat further from the alternator than the diode element as such.

Manufacture and assembly of the end cap is simple and various well known manufacturing processes can be used. The end cap can be made of sheet metal, plastic-coated sheet metal, or of plastic itself. It can be made by injection molding, deep-drawing, extrusion, extrusion molding, punching, and thus by practically any well known manufacturing process and, therefore, can be an inexpensive element contributing substantially to efficient operation of the alternator-rectifier combination with which it is associated. It can be secured to the alternator by any well known means, for example by the same holding bolts which also secure the alternator together—or to extensions thereof—or it can be snapped over the alternator end, for example by forming a resilient rim thereon which snaps over small protrusion or beads or projections formed on the alternator, or components thereof or associated therewith.

Drawings, illustrating a preferred example, wherein:

FIG. 1 is a fragmentary longitudinal axial view through the slip ring end portion of an alternator of the automotive type, and illustrating additionally rectifier components associated therewith, as more specifically illustrated in cross referenced applications Ser. No. 085,113, filed Oct. 15, 1979, HAGENLOCHER et al or Ser. No. 085,111, filed Oct. 15, 1979, HAGENLOCHER et al;

FIG. 2 is a cross-sectional view of the cover cap removed from the alternator along section II—II of FIG. 3; and FIG. 3 is an end elevational view of the cover cap, looked at from the right side with respect to FIG. 1 or 2.

A shell-type, essentially cylindrical housing 11 of a three-phase alternator of the automotive type has an end cover and support plate 12 secured thereto which, in plan view, has star-shaped fins or projections forming cooling fins. A second support plate 13 is axially spaced from the support plate 12 and secured thereto by spacer elements 13' and rivets, not shown, as described in detail in the aforementioned referenced applications. A bearing 15 is set into a hub portion of the plate 12 to journal the alternator shaft 16. The alternator shaft 16 carries slip rings 17, which are in engagement with brushes guided in a brush holder 18, on which a voltage regulator 19 is mounted. Rectifier diodes 14 are secured on or in the plates 12, 13. Further rectifier diodes 21, connected to the field of the alternator, provide rectified current to the exciter field. The alternator field and armature winding, as well as the respective diodes 14 and their support and heat dissipating plates 12, 13 all require cooling. These components are protected against contact or damage by a cover cap 22. The cover cap 22 is formed with openings 23, 24, 25, 29 (FIGS. 1, 3) to supply cooling air to the voltage regulator 23 and to the diodes 14, as well as to the other components of the alternator.

The alternator carries a fan blade (not shown), as well known and forming a standard construction, and draws air through the openings axially into the alternator in the direction of the arrows A, thus inducing an axial cooling air flow.

The cover cap 22 has rim portions 22a (FIG. 2) and a bottom portion 22b. The various cooling ingress openings are best seen in FIG. 3. The rectifier diodes 14 have cooling air guided thereto by openings 24, 25, 26 formed as in-turned collars, as best seen in FIG. 2. The brush holder 18 and the voltage regulator 19 are positioned within an outwardly directed bulge 27 which is apertured with slits 23 (see FIG. 3). Slits 28 are also located in the bulge, in order to direct cooling air to the slip rings and the engagement point of the brushes with the slip rings. The slits 28 also provide cooling air for the bearing 15. Additional slits 29 provide cooling air to cool the respective plate-like fins or heat sinks 12, 13 in which the diodes 14 are mounted.

The slits 23, 28, 29 can also be formed with in-turned collars, similar to the openings 24, 25, 26, and the arrangement and positioning of the respective slits in the bottom portion 22b, which includes the outwardly directed bulge 27, can be as desired and to match the cooling requirements of a specific alternator.

The cap 22 is formed with openings 31 adjacent the outer edge thereof to permit attachment to the alternator 11, for example by extended bolt portions which are normally present on automotive-type alternators, and which extend axially adjacent the outer circumference. The cap can then be secured to the extended bolt portions by means of nuts, as well known, and therefore not specifically shown in the drawings for simplicity. Other attachment arrangements may be used, for example by forming the edge of the rim portion 22a with a slight enlargement which clamps over or snaps around the shell 11, for example by engaging around a bead or up-turned deformations projecting from the outer edge of the shell 11. The cap can also be formed with an extension which is clamped on the shell 11 by an interference fit.

The end cap 22, preferably, is formed with an inwardly extending wall 27'; additional openings may be formed therein, for example a square opening which can receive a terminal bolt B+ (FIG. 1) and forming the output terminal of the alternator; an additional opening 33 can be provided, for example to receive an additional terminal or form a feed-through hole to receive a rubber bushing and a connecting wire, for example between the alternator-rectifier-voltage regulator assembly and external indicator elements, such as a charge indicator lamp.

Various changes and modifications may be made within the scope of the inventive concept.

We claim:

1. For and in an alternator rectifier combination, particularly for automotive use, having
    an alternator stator housing;
    a shaft (16);
    an end plate (12) secured to the housing;
    bearing means (15) secured in said end plate and journaling the shaft;
    rectifier diodes (14) supported by said end plate to form a combination end plate—rectifier diode support plate assembly (12, 13, 14), said end plate providing heat dissipation and cooling for said rectifier diodes;
    wherein an air flow (A) is induced in axial direction of the alternator to provide for cooling of said combination end plate—diode support plate assembly, and further for cooling of component elements of the alternator which, in operation, require cooling;
    and a protective cover cap and air flow directing element, comprising, in accordance with the invention,
    a cup-like structure (22) formed with openings (23, 24, 25, 26, 28, 29) therein located on said assembly in essentially axial alignment with said diodes and said component elements and positioned in advance—in the direction of said air flow—of said end plate to direct said axially induced air flow on said diodes and component elements and cool said diodes and component elements.

2. Combination according to claim 1, including inwardly directed air directing collars extending from at least some of said openings (24, 25, 26) towards said diodes to form air directing ducts and directing a stream of air on the respective diode.

3. Combination according to claim 2, wherein at least some of said collars surround, at least in part, some of said diodes to direct the stream of air to flow against and around the diodes.

4. Combination according to claim 1, wherein some of the openings (23, 28, 29) are formed as elongated slits.

5. Combination according to claim 1, wherein said cup-like structure has a rim portion (22a) and a bottom portion (22b), the rim portion fitting against said alternator and spacing the bottom portion from the alternator by a distance longer than the longest projection of any one of said component elements from the alternator, to prevent casual contact therewith.

6. Combination according to claim 1, wherein the cross-sectional areas of the respective openings (23, 24, 25, 26, 28, 29) have a relative relationship with respect to each other and to the airflow (A) such that the respective component elements (12, 13, 14, 15, 17, 18, 19) receive the appropriate proportional amount of cooling air flow as required by the heat dissipation of the respective elements, when in operation.

7. Combination according to claim 1, wherein the cover cap comprises a sheet metal cup-like structure.

8. Combination according to claim 7, wherein the sheet metal structure is plastic-coated.

9. Combination according to claim 1, wherein the cover cap is made of plastic.

10. Combination according to claim 1, wherein said component elements include a brush holder (18), a voltage regulator (19) and the bearing (15);

and wherein said openings are positioned and located to direct air of said induced air flow to cool said diodes (14), the voltage regulator (19), the brush holder (18) and the bearing (15).

* * * * *